BEST AVAILABLE COPY

T856044

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1020

630,130

PROCESS FOR SEPARATING BY-PRODUCT TAR FROM ANHYDROUS MONOVINYLACETYLENE CATALYST SOLUTION

Earle Eugene Fischer, Richmond, Va., and Richard Misak Tabibian, Wilmington, Del., assignors to E. I. du Pont de Nemours and Company, Wilmington, Del., a corporation of Delaware

Filed Apr. 11, 1967. Published Nov. 26, 1968
Class 260—678
1 Sheet Drawing. 12 Pages Specification

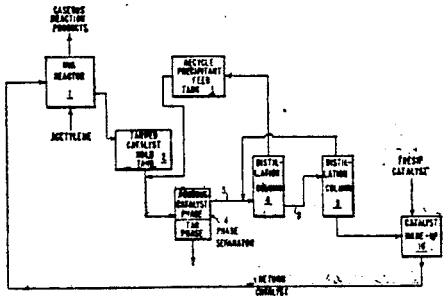

The process of polymerizing acetylene to monovinyl acetylene in the presence of an essentially anhydrous cuprous chloride catalyst solution containing less than 40% by weight of said solution of an anhydrous liquid carboxylic acid amide solvent containing not more than six carbon atoms, monovinylacetylene being recovered from the exit gas and the resulting tar-containing catalyst being continuously withdrawn, the improvement being one wherein said withdrawn tar-containing catalyst is contacted with a tar-precipitating amount of an aqueous solution of an aliphatic nitrile compound such as acetonitrile to insolubilize and precipitate said tar, followed by recovering said cuprous chloride catalyst which can be recycled for further acetylene polymerization. This removal of tar permits the process to be run at high temperatures and high conversion rates. It is preferred that said nitrile compound be present in aqueous solution between about 3% and 30% by volume and that the ratio of said aqueous tar precipitating solution to said tarred catalyst solution be between about 0.5:1 to about 2:1 by volume. The aliphatic nitrile compounds that can be utilized should have a boiling point below that of said amide solvent and include valeronitrile, dimethylpropionitrile, 1-methylbutyronitrile, propionitrile and butyronitrile. The heretofore described use of said nitrile compounds facilitates the removal of same from the reaction catalyst.

BEST AVAILABLE COPY
T856044
U.S. PTO. Hydrogen
CLASS 260 SUBCLASS 678
APPROVED BY DRAFTSMAN
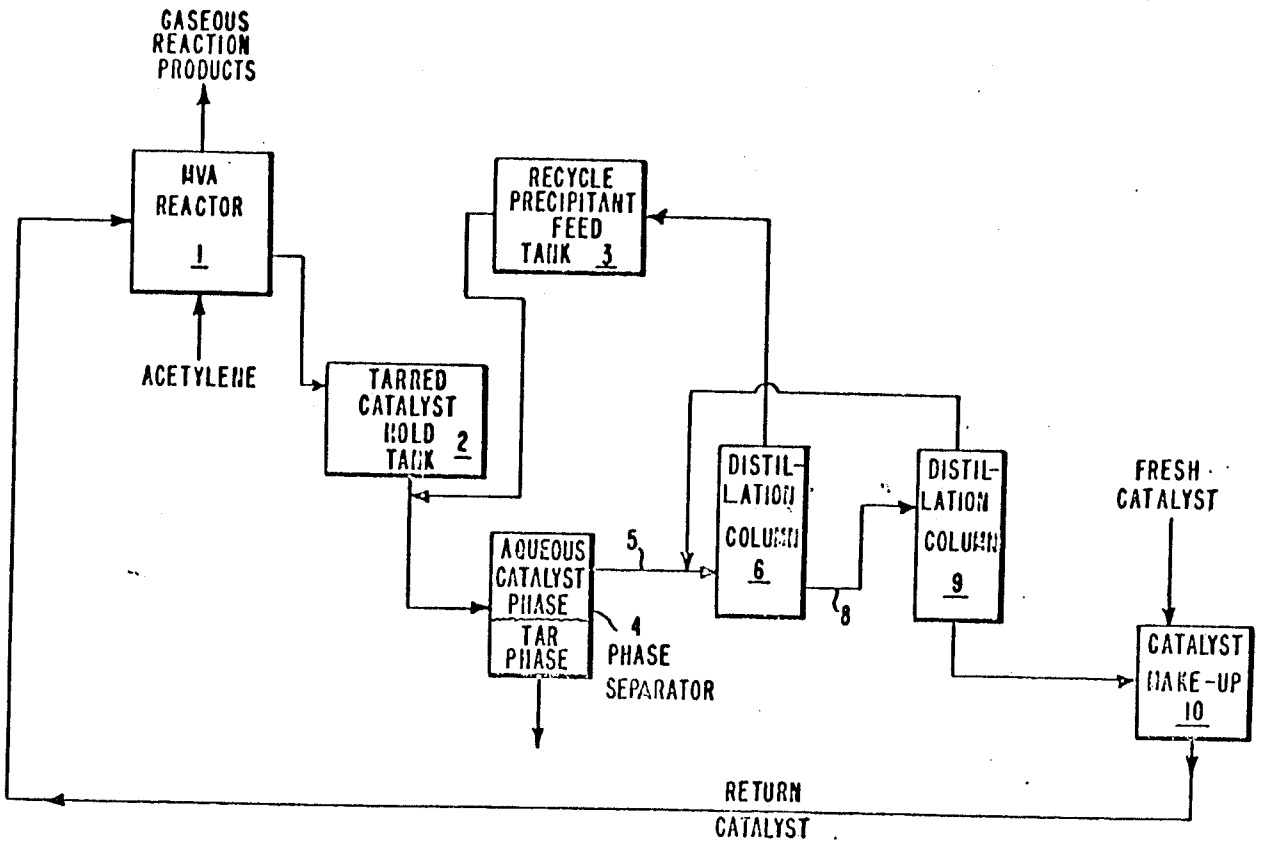
INVENTORS
EARLE EUGENE FISCHER,
RICHARD MISAK TABIBIAN
BY Walter H. Steinberger
ATTORNEY